US008567032B2

(12) United States Patent
de Traglia Amancio Filho et al.

(10) Patent No.: US 8,567,032 B2
(45) Date of Patent: Oct. 29, 2013

(54) METHOD FOR JOINING METAL AND PLASTIC WORKPIECES

(75) Inventors: Sergio de Traglia Amancio Filho, Börnsen (DE); Jorge F. dos Santos, Tespe (DE)

(73) Assignee: Helmholtz-Zentrum Geesthact Zentrum für Material-und Küstenforschung GmbH, Geesthacht (DE)

( * ) Notice: Subject to any disclaimer, the term of this patent is extended or adjusted under 35 U.S.C. 154(b) by 316 days.

(21) Appl. No.: 12/959,903

(22) Filed: Dec. 3, 2010

(65) Prior Publication Data

US 2011/0131784 A1  Jun. 9, 2011

(30) Foreign Application Priority Data

Dec. 3, 2009  (EP) ..................... 09015014

(51) Int. Cl.
  *B23P 11/00*   (2006.01)
(52) U.S. Cl.
  USPC ............................. 29/428; 29/283.5; 411/171
(58) Field of Classification Search
  USPC ............. 29/432.1, 432.2, 505, 521, 700, 798, 29/428, 283.5; 411/171, 500–501
  See application file for complete search history.

(56) References Cited

U.S. PATENT DOCUMENTS

| | | | | |
|---|---|---|---|---|
| 4,831,711 A | * | 5/1989 | Rapp ............................... | 29/509 |
| 5,155,897 A | * | 10/1992 | Schleicher ........................ | 29/509 |
| 5,479,687 A | * | 1/1996 | Sawdon .......................... | 29/243.5 |
| 6,205,640 B1 | * | 3/2001 | Dubugnon .................... | 29/522.1 |
| 6,247,633 B1 | * | 6/2001 | White et al. ................. | 228/112.1 |
| 7,497,917 B2 | | 3/2009 | Chen et al. | |
| 7,695,656 B2 | * | 4/2010 | Chen et al. ....................... | 264/68 |
| 7,780,432 B2 | * | 8/2010 | De Traglia Amancio Filho et al. .............................. | 425/517 |
| 2002/0179682 A1 | * | 12/2002 | Schilling et al. ............ | 228/112.1 |
| 2006/0213954 A1 | * | 9/2006 | Ruther et al. .................. | 228/113 |
| 2007/0044901 A1 | * | 3/2007 | Chen et al. ..................... | 156/182 |
| 2007/0124912 A1 | * | 6/2007 | De Traglia Amancio Filho et al. ............................... | 29/447 |

FOREIGN PATENT DOCUMENTS

| | | |
|---|---|---|
| DE | 102006053800 A1 | 5/2008 |
| FR | 2883499 A1 | 9/2006 |
| WO | 0136144 A1 | 5/2001 |

* cited by examiner

*Primary Examiner* — Minh Trinh
(74) *Attorney, Agent, or Firm* — Hovey Williams LLP

(57) ABSTRACT

The present invention relates to a method for connecting a metal workpiece and a plastic workpiece by means of a joining tool, including positioning the metal workpiece and the plastic workpiece, bringing the front end of the pin, the sleeve and the clamping ring in contact with an outer surface of the metal workpiece, rotating the sleeve and the pin so as to generate friction between the front ends of the sleeve and the pin and the outer surface of the metal workpiece, and moving the pin and the sleeve in the axial direction while both are rotated, one of the sleeve and the pin penetrating into the metal workpiece and the other of the sleeve and the pin being retracted from the outer surface thereof. The axial movement into the metal workpiece is stopped before the one of the sleeve and the pin reaches the contact surface and after stopping the axial movement the one of the sleeve and the pin is retracted from the metal workpiece and the other is moved towards the outer surface of the metal surface until the front ends of the pin and the sleeve are on the same level.

14 Claims, 3 Drawing Sheets

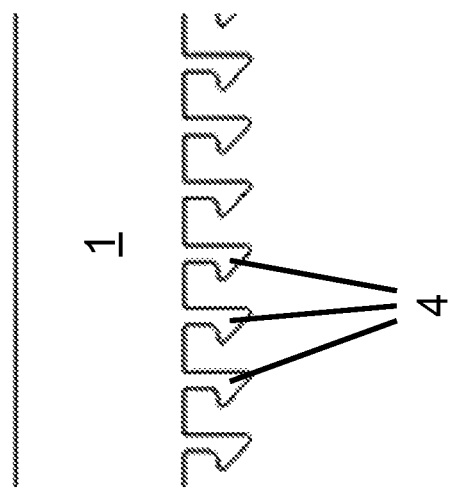

METHOD FOR JOINING METAL AND PLASTIC WORKPIECES

CROSS-REFERENCE TO RELATED APPLICATION

Figure 1:
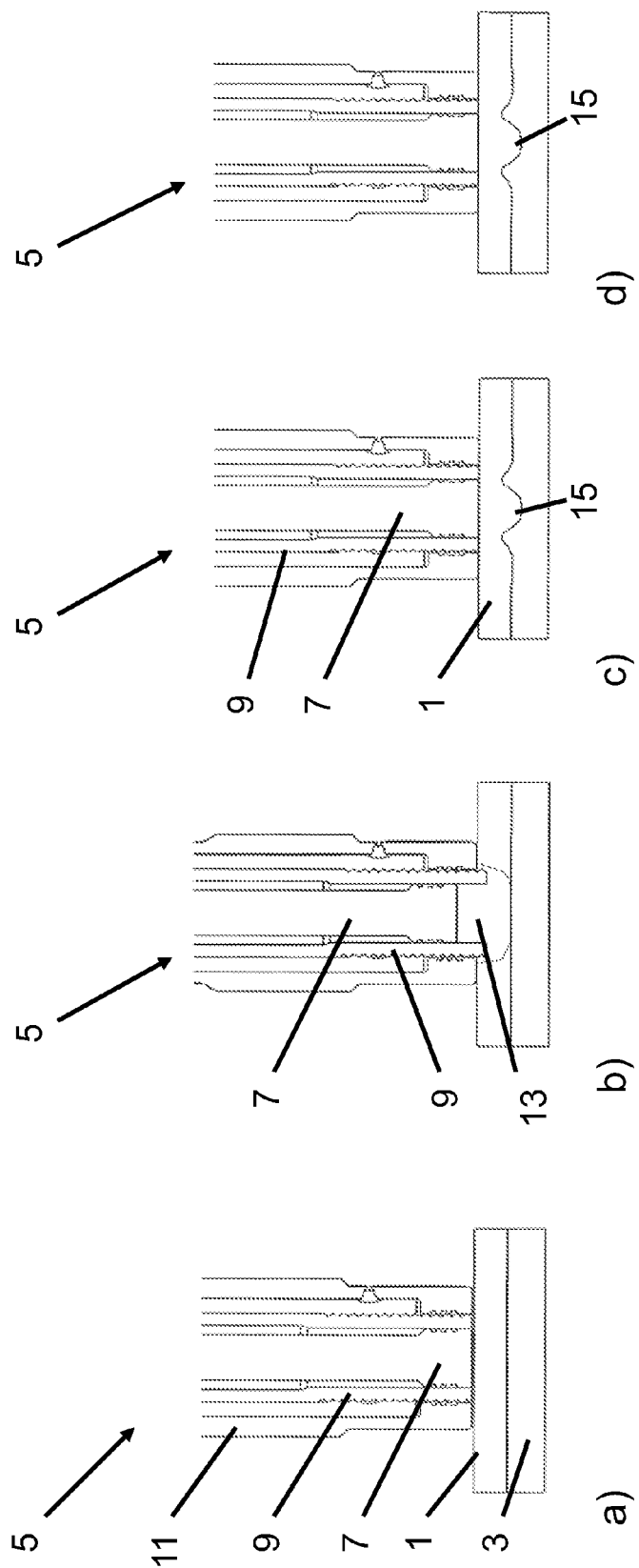

The present application claims the benefit of and priority from European Patent Application Serial No. EP 09015014.5, filed Dec. 3, 2009, the entire disclosure of which is hereby incorporated by reference herein.

BACKGROUND OF THE INVENTION

1. Field of the Invention

The present invention relates to a method for connecting a metal workpiece and a plastic workpiece by means of a joining tool.

2. Discussion of the Prior Art

In the fields of automotive and aviation technology as well as in medical applications devices are often employed which are a combination of metal and plastic workpieces, and it is expected that the number of these applications will significantly grow in the future. Such combinations are often used in order to reduce weight by still maintaining the desired properties of the device, e.g. stiffness or resistance against corrosion. In this regard, it is required to provide for reliable methods to join the different components of the devices and in particular to join metal components with plastic components in a sufficiently reliable and efficient manner.

From the prior art it is known to employ rivets or screws for the purpose of connecting workpieces of different materials. However, these mechanical connections involve additional elements which lead to an increase of the weight of the device. In particular, for aviation applications, this effect is disadvantageous as it is a main requirement in this field to ensure that the weight of a each device is minimized. Further disadvantages of mechanical connections are the fact that high stress concentration levels are generated at the location of the connection, and that the connection itself may form the starting point for a crack in at least one of the components. Finally, a connection with an additional element such as a screw or rivet may lead to an unpleasant appearance which is an often unwanted effect.

Whereas in case of connections between two metal components conventional welding techniques such as ultrasonic, resistance, vibration, infrared or induction welding, have proven to be extremely useful even in situations where only punctual connections are possible, these techniques cannot be employed in case of metal/plastic connections in the same manner as in metal/metal connections. Usually the welding temperatures for metal are much higher than for thermoplastic materials, and thermoset materials cannot be welded at all since these materials do not melt. Therefore, the weld seam has to be positioned in the thermoplastic material in its entirety whereas the structure of the metal component remains essentially unchanged.

Further, it is disadvantageous that when traditional welding techniques are applied, often a previous surface treatment is required which is time consuming. Moreover, welding is often connected with a high energy input, which may lead to the problem that the material in the vicinity of the welding point is significantly influenced and the material properties are altered.

Another viable option is the application of special adhesives to connect workpieces formed of different materials. Here, it has turned out that those adhesives which provide for a sufficiently stable connection, produce toxic gases at least during curing or require the application of heat so that additional measures are necessary to prevent the gases from getting into contact with workers in the vicinity of the connection formed by gluing or the materials from being altered due to the heat.

From U.S. Pat. No. 7,497,917 it is know to produce a connection between metal and plastic workpieces by providing a layer of heat activatable adhesive on the surface of the plastic workpiece that is facing towards the metal workpiece. Subsequently, a friction stir welding tool engages with a surface of the metal workpiece opposite of the plastic workpiece. Due to the frictional heat generated by the rotatingly driven friction stir welding tool the adhesive is molten. After the tool has been stopped to rotate and removed from the surface of the metal workpiece the adhesive will harden and a joint will be formed.

Moreover, it is described in U.S. Pat. No. 7,497,917 to connect a metal workpiece and a plastic workpiece by first forming a hole in the metal workpiece and then bringing the metal workpiece in contact with the plastic workpiece. In the following, a ring shaped friction stir welding tool is brought into engagement with the surface of the metal workpiece so that it surrounds the hole. Due to the heat generated by the rotating friction stir welding tool the plastic workpiece melts and plasticized material flows into the hole so that a positive joint with mechanical interlocking between the joining partners is formed.

The methods described in the afore-mentioned publication suffer from the following disadvantages. In the first embodiment, it is required to apply the adhesive to one of the workpieces, so that in this case an additional step is needed which makes the method time consuming and less flexible. Further, it is questionable whether a joint formed by an adhesive only is sufficiently stable. In the second example it is required that in a first step a hole is drilled into the metal workpiece which is an additional time consuming step. Further, plastic material flows into the hole and to the visible side of the metal workpiece. Thus, this might lead to the unwanted effect that the position of the joint can easily be identified. Finally, a hole has to be produced in the metal workpiece which leads to a reduced strength of the workpiece in the region of the joint.

SUMMARY

Therefore, it is the object of the present invention to provide a method for joining metal and plastic workpieces and in particular for forming a lap joint which method can easily be applied and which does not have the afore-mentioned disadvantages.

This object is achieved by a method for connecting a metal workpiece and a plastic workpiece by means of a joining tool comprising a pin which is movable along its axial direction, a sleeve which surrounds the pin, is rotationally driven and movable with respect to and in the axial direction of the pin, and an outer clamping ring surrounding the sleeve. The method includes the steps of positioning the metal workpiece and the plastic workpiece such that contact surfaces of the workpieces abut on each other, and positioning the joining tool on the metal workpiece by bringing the front end of the pin, the sleeve and the clamping ring in contact with an outer surface of the metal workpiece, the outer surface being opposite to the contact surface of the metal workpiece. The method also includes the steps of rotating the sleeve and the pin so as to generate friction between the front ends of the sleeve and the pin and the outer surface of the metal workpiece, and moving the pin and the sleeve in the axial direction of the pin while both are rotated, one of the sleeve and the pin penetrating into the metal workpiece and the other of the sleeve and the pin being retracted from the outer surface thereof. The axial movement into the metal workpiece is stopped before the one of the sleeve and the pin reaches the contact surface. After stopping the axial movement the one of the sleeve and the pin is retracted from the metal workpiece and the other is moved towards the outer surface of the metal surface until the front ends of the pin and the sleeve are on the same level.

When positioning the preferably non-consumable joining tool and bringing the front end of the pin, the sleeve and the clamping ring in contact with an outer surface of the stack formed by the metal and plastic workpieces they are fixed in position relative to each other. The workpieces are arranged such that a lap joint may be formed. Rotating the sleeve and the pin results in frictional heat and the metal workpiece will be plasticized. The axial movement in opposite direction of the pin and the sleeve squeezes plasticized metal into a volume which was occupied by the pin or the sleeve before.

Since the axial movement of the pin or the sleeve into the metal workpiece is stopped before the contact surface is reached, it is on the one hand achieved that a volume extending from the outer surface of the metal workpiece to the contact surface is plasticized in its entirety and on the other hand that the structure of the plastic workpiece is not affected or even damaged. In particular, reinforcing material inside the plastic workpiece such as fibers cannot be destroyed. However, since the entire volume is plasticized an extremely high amount of heat is transferred to the plastic workpiece so that it is melt without being substantially deformed.

Due to the axial movement of the pin or sleeve the plasticized material is intermittently pressed into the space which is cleared either by the pin or the sleeve. When the pin and the sleeve are moved back to the initial position, the plasticized metal is pressed back into the metal workpiece with the effect that a metallic "nub" is created at the interface between the metal and the plastic workpieces, the nub protruding into the plastic workpiece, i.e. a protrusion is formed either centrally arranged with respect to the tool or annularly shaped.

In addition, after stopping rotation the material of the workpieces hardens and adhesion occurs at the interface between the workpieces. Thus, by the method of the present invention an joint is formed which is a combination of a positive joint due to the nub and an adhesive joint. However, the method does not suffer from the afore-mentioned negative effects which usually occur during production of an adhesive joint. Therefore, this method is a good candidate for substituting riveting and traditional adhesive bonding owing to its positive features.

It is preferred that the sleeve penetrates into the metal workpiece while the pin is retracted during the step of axial movement. This results in a circularly shaped nub which protrudes deeper into the plastic material than a ring shaped nub which would be produced when the sleeve is retracted and the pin penetrates into the metal workpiece.

Preferably, the penetration depth up to which either the pin or the sleeve penetrate into the metal workpiece, is below 25% of the distance between the outer surface and the contact surface of the metal workpiece and most preferably below 20%. This ensures that on the one hand the metal material is fully plasticized, i.e. the entire region between the outer surface and the contact surface, and that on the other hand the structure of the plastic surface is not damaged.

In order to improve the reliability of the connection it is preferred that before positioning the joining tool on the outer surface the contact surfaces of the metal workpiece and the plastic workpiece are subject to a cleaning step. In particular, it is conceivable that such cleaning step includes grinding off the contact surfaces of the workpieces.

The stability of the joint can further be increased by texturing the contact surface of the metal workpiece. This leads to a more distinct positive engagement between the workpieces. A significant effect can be achieved when providing protrusions on the contact surface of the metal workpiece.

Furthermore, it is preferred that the joining tool is removed from the outer surface of the metal workpiece after expiration of a predetermined time period after stopping of the axial movement of the sleeve and the pin. During this time period the plasticized material of the workpieces may harden while being held in position by the outer ring.

Particularly good results have been achieved when the metal workpiece is formed of aluminum or magnesium and the plastic workpiece from polyphenylene sulfide.

Since in the method of the present invention the structure of the plastic workpiece is prevented from being damaged, it can advantageously applied to plastic workpieces which are formed from a fiber reinforced material. Here, the fibers cannot be deformed so that the rigidity of the plastic workpiece is not affected by the joining process.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Figure 2:
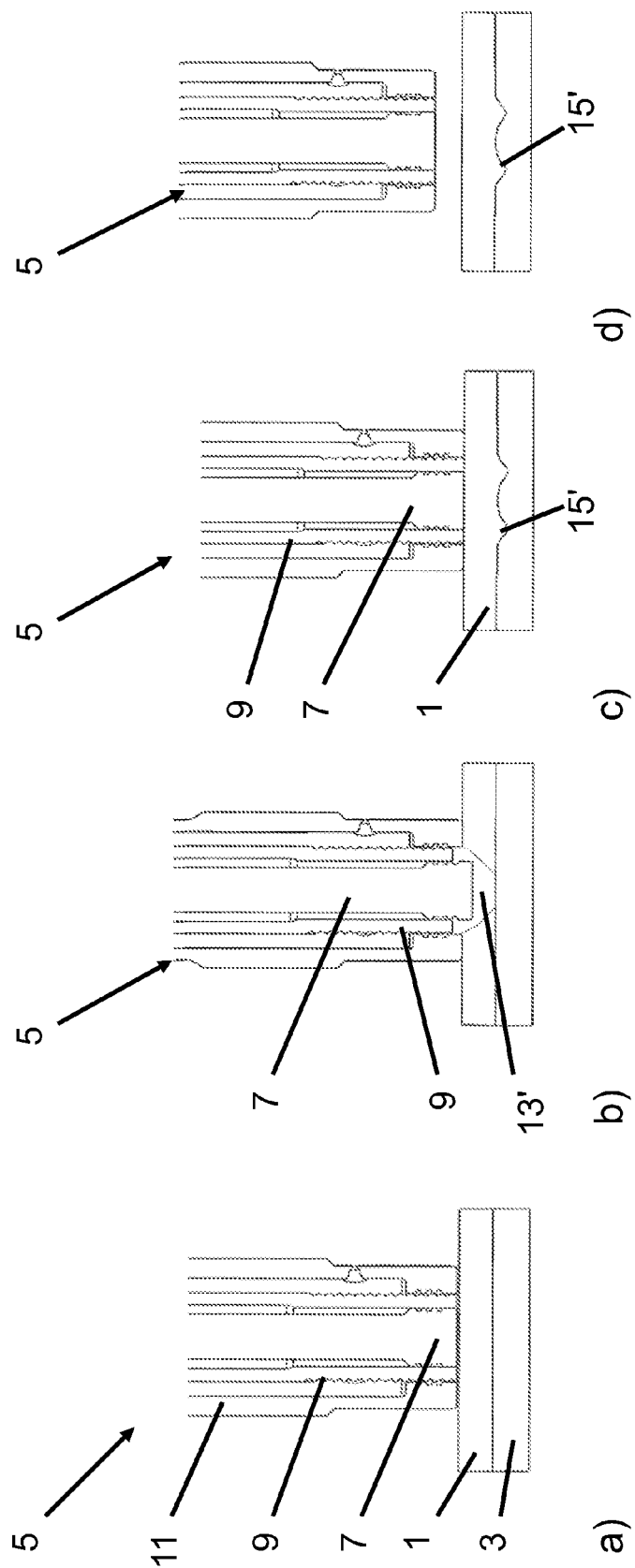

In the following the method of the present invention will be described by way of example with respect to the accompanied drawings in which:

FIG. 1 shows the steps of a first example of the method of the present invention, FIG. 2 shows a second example of a method of the present invention, and FIG. 3 shows an enlarged cross sectional view of the metal workpiece.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

As shown in Part a) of FIG. 1 in a first step of an example of the method according to the present invention a metal workpiece 1 and a plastic workpiece 3 are positioned such that contact surfaces of the workpieces 1, 3 abut on each other and a stack is formed. Here, even though it is not shown in the schematic representation of the present example of the joining method the contact surfaces of the workpieces 1, 3 may be cleaned by grinding off these surfaces before being positioned on each other.

In the present example the metal workpiece 1 is formed of aluminum or magnesium and the plastic workpiece 3 is made of polyphenylene sulfide. Further, the plastic workpiece 3 comprises fibers to reinforce the workpiece. In addition, the contact surfaces of the metal workpiece 3 may be textured and, in particular, provided with protrusions 4 which improve the stability of the joint formed as described below (see FIG. 3).

After positioning of the workpieces 1, 3, a joining tool 5 is lowered onto the outer surface of the metal workpiece 1. In this preferred embodiment a non-consumable tool is employed, i.e. material of the tool itself does not become part of the connection between the workpieces, so that the tool remains essentially unaffected. The joining tool 5 comprises a pin 7 which is movable in its axial direction and rotationally driven. Further, a sleeve 9 is provided which surrounds the pin 7 and is also rotationally driven and movable in the axial direction of the pin 7. Thus, the pin 7 and the sleeve 9 can be moved in opposite directions along a common axis which is defined by the longitudinal axis of the pin 7. Finally, an outer clamping ring 11 surrounds the sleeve 9 and is fixedly mounted on the tool 5 so that the sleeve 9 may rotate inside the ring 11 and may axially move with respect thereto.

As indicated in FIGS. 1 and 2, the radially outer and inner surfaces of the sleeve 9 as well as the radial outer surface of the pin 7 may be textured, i.e. being provided with a thread.

In the initial position, the front end of the pin 7, the sleeve 9 and the clamping ring 11 are located in a common plane so that all of these elements get into contact with the outer surface of the metal workpiece 1 at the same time when the tool 5 is lowered, the outer surface being opposite the contact surfaces of the workpieces 1, 3.

In the following, the pin 7 and the sleeve 9 are rotated by a drive mechanism not shown so as to generate friction between the front ends of the pin 7 and the sleeve 7 on the one hand and the outer surface of the metal workpiece 1 on the other. This results in a plasticizing of the metal workpiece 1 in the region where it is in contact with the pin 7 and the sleeve 9.

As shown in Part b) of FIG. 1, the pin 7 and the sleeve 9 are then moved in the axial direction of the pin 7 in opposite directions while both are rotatingly driven. In particular, the sleeve 9 penetrates into the metal workpiece 1, while the pin 7 is retracted from the outer surface thereof.

Due to this movement in opposite directions a space is formed between the front end of the pin 7 and the surface of the metal workpiece 1, and plasticized metal is pressed into this space by the sleeve 9 moving towards the plastic workpiece 3.

The axial movement of the sleeve 9 and the pin 7 is stopped before the front end of the sleeve 9 reaches the contact surface between the metal workpiece 1 and the plastic surface 3. In particular, the penetration depth up to which the sleeve 9 penetrates into the metal workpiece 1, is below 20% of the distance between the outer surface and the contact surface of the metal workpiece 1. This suffices so that in this position a volume 13 of metal inside the sleeve 9 and between the outer surface and the contact surface is plasticized and thus heated up in its entirety. Therefore, a large amount of heat is transferred to the plastic workpiece 3 which results in melting of the plastic material in the region adjacent to the contact surface. However, since the sleeve 9 does not penetrate into the plastic workpiece 3 or even penetrate it, its structure is not affected.

After stopping the axial movement of the pin 7 and the sleeve 9, the latter is retracted from the metal workpiece 1, while the pin 7 is moved towards the outer surface of the metal workpiece 1, until the front ends of the pin 7 and the sleeve 9 are on the same level, i.e. the level of the outer surface (see Part c) of FIG. 1).

This simultaneous movement of the pin 7 and the sleeve 9 squeezes the plasticized metal back into that region of the metal workpiece 1 where it was originally located. However, the pressure applied by the forwardly moving pin 7 leads to the effect that a nub 15 of metal is formed which protrudes into the plastic material. This occurs because the plastic material in the corresponding region is still in the molten state when the pin 7 moves down allowing the plasticized metal to be deformed.

When the pin 7 and the sleeve 9 are on the same level, rotation is stopped so that the material of the workpieces 1, 3 hardens and adhesion occurs at the interface between the workpieces 1, 3. In order to support this process the joining tool 5 may stay in contact with the outer surface of the metal workpiece 1 and maintain the pressure for a predetermined period of time.

In FIG. 2 a second example of the method of the present invention is shown which differs from the first example in that in the first stage the pin 7 penetrates into the metal workpiece 1 whereas the sleeve 9 is retracted simultaneously. When the sleeve 9 moves back to the initial position, plasticized metal is squeezed back from the space inside the tool 5 between the ring 11 and the pin, wherein a ring shaped nub 15' is produced.

As apparent from the above description, by the method of the present invention a joint can be formed which is a combination of a positive joint due to the nub 15 and an adhesive joint. The method does not suffer from the negative effects which usually occur during production of an adhesive joint. Thus, this method is a good candidate for substituting riveting and traditional adhesive bonding owing to its positive features.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and access the reasonably fair scope of the present invention as pertains to any apparatus not materially departing from but outside the literal scope of the invention set forth in the following claims.

What is claimed is:

1. Method for connecting a metal workpiece and a plastic workpiece using a joining tool including a pin movable along an axial direction, a sleeve surrounding the pin and being rotationally driveable and movable with respect to and in the axial direction of the pin, and an outer clamping ring surrounding the sleeve, said method comprising the steps of:

positioning the metal workpiece and the plastic workpiece such that contact surfaces of the workpieces abut on each other;

positioning the joining tool on the metal workpiece so as to bring a front end of the pin, the sleeve, and the clamping ring into contact with an outer surface of the metal workpiece, the outer surface being opposite the contact surface of the metal workpiece;

rotating the sleeve and the pin so as to generate friction between the front ends of the sleeve and the pin and the outer surface of the metal workpiece; and moving the pin and the sleeve in the axial direction of the pin while both the pin and the sleeve are rotated, one of the sleeve and the pin penetrating into the metal workpiece and the other of the sleeve and the pin being retracted from the outer surface thereof, wherein the axial movement into the metal workpiece is stopped before said one of the sleeve and the pin reaches the contact surface, wherein, after stopping the axial movement, said one of the sleeve and the pin is retracted from the metal workpiece and said other of the sleeve and the pin is moved toward the outer surface of the metal workpiece until the front ends of the pin and the sleeve are on the same level.

2. Method according to claim 1,
wherein a protrusion is formed on the contact surface of the metal workpiece, the protrusion extending into the plastic workpiece.

3. Method according to claim 1,
wherein the sleeve penetrates into the metal workpiece and the pin is retracted from the outer surface of the metal workpiece during the step of axial movement.

4. Method according to claim 1,
wherein the penetration depth up to which said one of the pin and the sleeve penetrates into the metal workpiece, is less than 25% of the distance between the outer surface and the contact surface of the metal workpiece.

5. Method according to claim 4,
wherein the penetration depth up to which said one of the pin and the sleeve penetrates into the metal workpiece is less than 20% of the distance between the outer surface and the contact surface of the metal workpiece.

6. Method according to claim 1, further comprising the step of:
cleaning the contact surfaces of the metal workpiece and the plastic workpiece before the step of positioning the joining tool on the metal workpiece.

7. Method according to claim 6,
said cleaning step including the step of grinding off the contact surfaces of the workpieces.

8. Method according to claim 1,
wherein the contact surface of the metal workpiece is textured.

9. Method according to claim 8,
wherein the contact surface of the metal workpiece includes protrusions.

10. Method according to claim 1, further comprising the step of:
removing the joining tool from the outer surface of the metal workpiece after expiration of a predetermined time period after stopping of the axial movement of the sleeve and the pin.

11. Method according to claim 1,
wherein the metal workpiece comprises aluminum.

12. Method according to claim 1,
wherein the metal workpiece comprises magnesium.

13. Method according to claim 1,
wherein the plastic workpiece comprises polyphenylene sulfide.

14. Method according to claim 1,
wherein the plastic workpiece comprises a fiber reinforced material.

* * * * *

UNITED STATES PATENT AND TRADEMARK OFFICE
CERTIFICATE OF CORRECTION

PATENT NO. : 8,567,032 B2  
APPLICATION NO. : 12/959903  
DATED : October 29, 2013  
INVENTOR(S) : Sergio de Traglia Amancio Filho and Jorge F. dos Santos Page 1 of 1

It is certified that error appears in the above-identified patent and that said Letters Patent is hereby corrected as shown below:

Title page, item (73); named Assignee reading "Helmholtz-Zentrum Geesthact Zentrum für Material-und-Küstenforschung GmbH" should read --Helmholtz-Zentrum Geesthacht Zentrum für Material-und-Küstenforschung GmbH--

Title page, item (30); Foreign Application Priority Data for the European priority application number reading "09015014" should read --09015014.5--

Signed and Sealed this  
Twenty-sixth Day of August, 2014

Michelle K. Lee  
*Deputy Director of the United States Patent and Trademark Office*